May 3, 1960   C. E. KATZFEY   2,934,875
LAWN EDGER GAUGE WHEEL
Filed Feb. 12, 1958

INVENTOR.
Clarence E. Katzfey
BY Victor J. Evans & Co.
ATTORNEYS

United States Patent Office 2,934,875
Patented May 3, 1960

2,934,875
LAWN EDGER GAUGE WHEEL
Clarence E. Katzfey, Bishop, Tex.

Application February 12, 1958, Serial No. 714,866

1 Claim. (Cl. 56—25.4)

This invention relates to a lawn edger or trimmer.

The object of the invention is to provide a lawn edger which includes a means whereby the depth of cutting by the edger can be regulated or changed as desired.

Another object of the invention is to provide a lawn edging machine which includes a frame or support member that has a motor or engine thereon, and wherein there is provided a manually operable means which can be used for regulating the depth of cutting by a rotary cutting disk or edger.

A further object of the invention is to provide a lawn edged which is extremely simple and inexpensive to manufacture.

Other objects and advantages will be apparent during the course of the following description.

In the accompanying drawings, forming a part of this application, and in which like numerals are used to designate like parts throughout the same.

Figure 1:
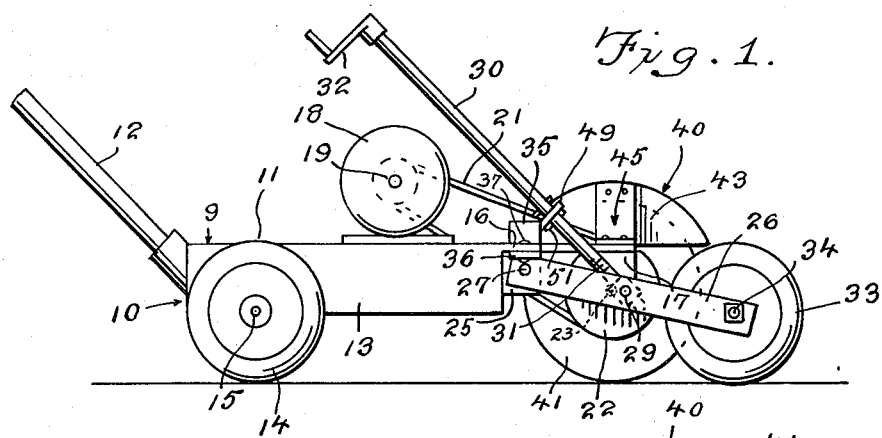
Figure 1 is a side elevational view illustrating the lawn edger of the present invention.

Referring in detail to the drawings, the numeral 10 indicates the lawn edger of the present invention, and the lawn edger 10 embodies a body member which is indicated generally by the numeral 9. The body member 9 is shown to comprise a horizontally disposed base 11 which has an inclined handle 12 extending upwardly from the rear thereof, Figures 1 and 2. Depending from the base 11 and arranged at the sides thereof is a pair of spaced parallel vertically disposed side walls 13, and the numeral 14 indicates a pair of rear ground engaging wheels which are connected to the body member 9 by means of axles 15.

As shown in the drawings, there is further provided a lip 16 which extends forwardly from one side of the base 11, and extending forwardly from the other side of the base 11 is a horizontally disposed finger 17, the finger 17 being longer than the lip 16. The numeral 18 indicates a conventional electric motor or engine which is supported on the base 11, for a purpose to be later described.

Figure 2:
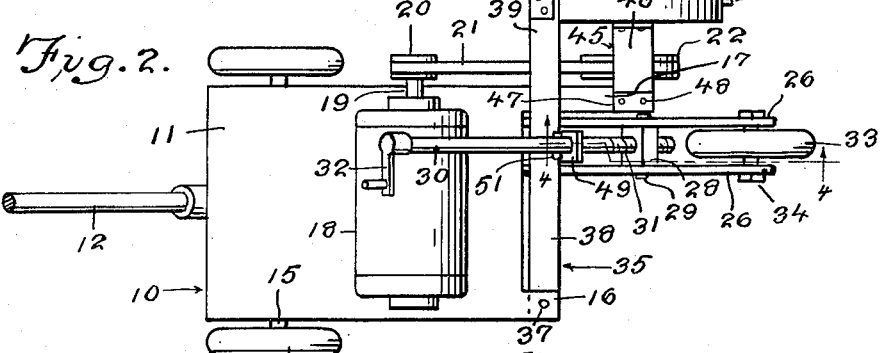
Figure 2 is a top plan view of the lawn edger.

Driven by the motor 18 is a drive shaft 19 which has a pulley 20 thereon, Figure 2, and on endless belt 21 is trained over the pulley 20. The numeral 22 indicates a pulley which also has the belt 21 trained thereover, and the pulley 22 is mounted on a driven shaft 23.

Figures 3, 4, 5:
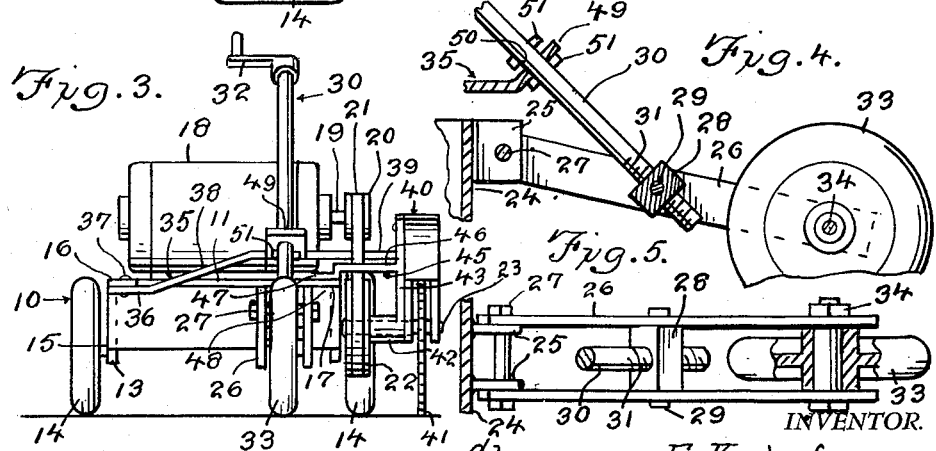
Figure 3 is a front end elevational view of the lawn edger.
Figure 4 is a fragmentary sectional view on the line 4—4 of Fig. 2 illustrating the means for adjusting the depth of cutting by the edger.
Figure 5 is a fragmentary plan view partly in section illustrating the mechanism for supporting the front wheel as shown in Figure 4.

Depending from the front of the base 11 is a vertically disposed flange 24, Figures 4 and 5. The numeral 25 indicates a pair of spaced parallel ears which extend forwardly from the flange 24 and which are secured thereto or formed integral therewith. A pair of spaced parallel movable bars 26 have their rear ends pivotally connected to the ears 25 by means of a pin or bolt 27. The numeral 28 indicates a bearing block which is mounted between the intermediate portions of the bars 26 by means of a pin assembly 29. A rotary rod 30 has a threaded portion 31 arranged in threaded engagement with the bearing block 28, and a hand crank 32 is arranged on the upper end of the rod 30. The numeral 33 indicates a front wheel which is journaled between the front ends of the bars 26 by means of an axle 34. As shown in the drawings, there is provided a support member which is indicated generally by the numeral 35, and the support member 35 includes a first portion 36 which is secured beneath the lip 16 by means of a securing element 37, Figure 3. The support member 35 further includes an inclined second portion 38 and a horizontally disposed third portion 39.

There is further provided a guard or shield which is indicated generally by the numeral 40, and the guard 40 is arranged over a rotary disk or toothed edger 41. The numeral 42 indicates a hub through which extends the driven shaft 23, and the shaft 23 is connected to the edger 41. An upstanding wall member 43 projects upwardly from the hub 42, and the wall member 43 defines a side of the guard 40. The numeral 45 indicates a bracket which comprises an end section 46 which is secured to or formed integral with the wall member 43, and the bracket 45 further includes an offset end section 47 which is secured as for example by means of securing elements 48, to the finger 17.

Extending upwardly from the portion 39 of the support member 35 and secured thereto or formed integral therewith is an inclined lug 49 which has an opening 50 therein, and the rod 30 extends through the opening 50. The numeral 51 indicates each of a pair of pins which extend through the rod 30, and the pins 51 are arranged on opposite sides of the lug 49.

From the foregoing, it is apparent that there has been provided a lawn edger which includes a means for adjusting the depth of the rotary edger or disk 41 and the edger 41 may be provided with teeth that are sharpened on both edges thereof or else it may be a spring steel blade having a continuous outer sharp edge. It is to be noted that with the parts arranged as shown in the drawings, the handle 12 can be used for moving the machine along the ground, and the wheels 14 and 33 provide a means whereby the machine can be readily moved along the area being worked on. It is to be noted that when the motor 18 is actuated, the shaft 19 will rotate the pulley 20 and this will cause the belt 21 to turn the pulley 22. Since the shaft 23 is connected to the pulley 22, and since the edger 41 is connected to the shaft 23, it will be seen that this will result in rotation of the edger 41. The edger 41 can be used for performing various trimming or edging operations on grass, weeds or the like, in the usual manner, and it will be seen that this continuous rotation of the edger 41 will effectively sever the grass at the desired location. When it is desired to change the depth of cutting by the edger 41, it is only necessary to manually rotate the rod 30 by turning the crank 32 in the proper direction, so that the rod 30 will turn in the bearing block 28. The rod 30 has its threaded portion 31 engaging the bearing block 28, and the bearing block 28 is mounted between the bars 26, the bars 26 being pivotally connected to the members 25 by means of the pivot pin 27. The rod 30 also extends loosely through the opening 50 in the lug 49 so that by turning the rod 30, the bars 26 will pivot up or down on the pin 27 so that the body member 9 can be shifted in position whereby the depth of cutting of the edger 41 can be changed as desired. It is to be noted that the edger 41 is connected in such a manner that as the member 9 changes position, the edger 41 will also change position up or down due to the provision of the pivot pin 27 which supports the bars 26 in a pivotal manner.

The guard 40 permits the edger 41 to rotate safely and the guard 40 is connected to the remaining part of the device by means of the bracket 45 and the wall member 43. Similarly, the rear of the guard 40 is connected to the body member 9 by means of the support member 35 as previously described. The pins 51 serve to maintain the rod 30 in proper position, and these pins 51 permit the rod 30 to rotate in the opening 50 of the lug 49.

Instead of using an electric motor 18, a suitable conventional gasoline engine can be used. The various parts can be made of any suitable material and in different shapes or sizes.

It is to be noted that there is sufficient space in the opening 50 so as to permit the rod 30 to rotate without binding. Due to the adjustable feature of the present invention, the edger can be adjusted so as to permit deeper or more shallow cutting or trimming. The depth of cutting by the edger is regulated by the rod 30 which is turned by the crank 32. The entire gauger is raised and lowered according to the height that the user wants his grass edged. The machine can be accurately and quickly set as for example when grass is to be cut uniformly along sidewalks, concrete driveways or the like. The principle of the present invention is applicable to both electric and gasoline driven motor types.

Minor changes in shape, size and rearrangement of details coming within the field of invention claimed may be resorted to in actual practice, if desired.

I claim:

In a lawn edger, a body member including a horizontally disposed base, an inclined handle extending upwardly from the rear of the base, a pair of vertically disposed spaced parallel side walls depending from said base, rear wheels connected to said body member, a lip extending forwardly from one side of the base, a finger extending forwardly from the other side of the base, said finger being longer than said lip, a motor supported on said base, a drive shaft extending from said motor, a vertically disposed flange depending from the front portion of the base, a pair of spaced parallel ears extending forwardly from said flange and secured thereto, a pair of spaced parallel movable bars having their rear ends pivotally connected to said ears, a bearing block mounted between said pair of ears, a rod having a threaded portion threadedly engaging said bearing block, a crank on the upper end of said rod, a front wheel member journaled between the front ends of said bars, a support member including a first portion secured beneath said lip, an inclined second portion extending from said first portion and said second portion terminating in a horizontally disposed third portion, a guard secured to the third portion of said support member, a circular edger rotatably arranged below said guard, a driven shaft connected to said edger, belt and pulley means connecting said drive and driven shafts together, a hub having said driven shaft extending therethrough, a wall member extending upwardly from said hub and said wall member forming an extension of the side of the guard, a bracket having an end secured to said wall member, said bracket including an offset end section secured to said finger, an inclined lug extending upwardly and forwardly from the support member, said lug having an opening therein for the projection therethrough of the rod, and pins extending through said rod and arranged on opposite sides of the last named lug.

References Cited in the file of this patent

UNITED STATES PATENTS

| | | |
|---|---|---|
| 2,608,043 | Berdan | Aug. 26, 1952 |
| 2,691,264 | Miller | Oct. 12, 1954 |
| 2,721,432 | Machovec | Oct. 25, 1955 |
| 2,816,410 | Nobles | Dec. 17, 1957 |
| 2,854,804 | Scott | Oct. 7, 1958 |